US008724957B2

United States Patent
Oisel et al.

(10) Patent No.: US 8,724,957 B2
(45) Date of Patent: May 13, 2014

(54) METHOD FOR SELECTING PARTS OF AN AUDIOVISUAL PROGRAM AND DEVICE THEREFOR

(75) Inventors: Lionel Oisel, La Nouaye (FR); Ewa Kijak, Dinge (FR); William Richard, Bruz (FR)

(73) Assignee: Thomson Licensing, Boulogne-Billancourt (FR)

( * ) Notice: Subject to any disclaimer, the term of this patent is extended or adjusted under 35 U.S.C. 154(b) by 1246 days.

(21) Appl. No.: 11/886,625

(22) PCT Filed: Mar. 14, 2006

(86) PCT No.: PCT/EP2006/060706
§ 371 (c)(1), (2), (4) Date: Sep. 17, 2007

(87) PCT Pub. No.: WO2006/097471
PCT Pub. Date: Sep. 21, 2006

(65) Prior Publication Data
US 2009/0034932 A1  Feb. 5, 2009

(30) Foreign Application Priority Data
Mar. 17, 2005  (FR) ..................... 05 50690

(51) Int. Cl.
*H04N 5/765* (2006.01)
*H04N 5/932* (2006.01)
(52) U.S. Cl.
USPC ......................... 386/200; 386/204

(58) Field of Classification Search
None
See application file for complete search history.

(56) References Cited

U.S. PATENT DOCUMENTS

| | | | |
|---|---|---|---|
| 5,708,767 A | 1/1998 | Yeo et al. | |
| 6,631,522 B1 | 10/2003 | Erdelyi | |
| 7,826,709 B2 * | 11/2010 | Moriya et al. | 715/202 |
| 2002/0184220 A1 | 12/2002 | Teraguchi et al. | |
| 2004/0056879 A1 * | 3/2004 | Erdelyi | 345/716 |

FOREIGN PATENT DOCUMENTS

| | | |
|---|---|---|
| WO | WO 02/07164 | 1/2002 |
| WO | WO 2004/014061 | 2/2004 |

OTHER PUBLICATIONS

Search Report Dated May 10, 2006.

* cited by examiner

*Primary Examiner* — William C Vaughn, Jr.
*Assistant Examiner* — Oluwaseun A Adegeye
(74) *Attorney, Agent, or Firm* — Tutunjian & Bitetto, P.C.

(57) ABSTRACT

The invention relates to a method of selecting parts of an audiovisual document. First, the document is analyzed by at least two subdividing means in order to extract from it at least two groups of audiovisual sequences. Then, selection criteria associated with each of the two subdividing means are entered. Finally, a list of sequences responding to all the selection criteria entered previously is generated.

Figure 1:
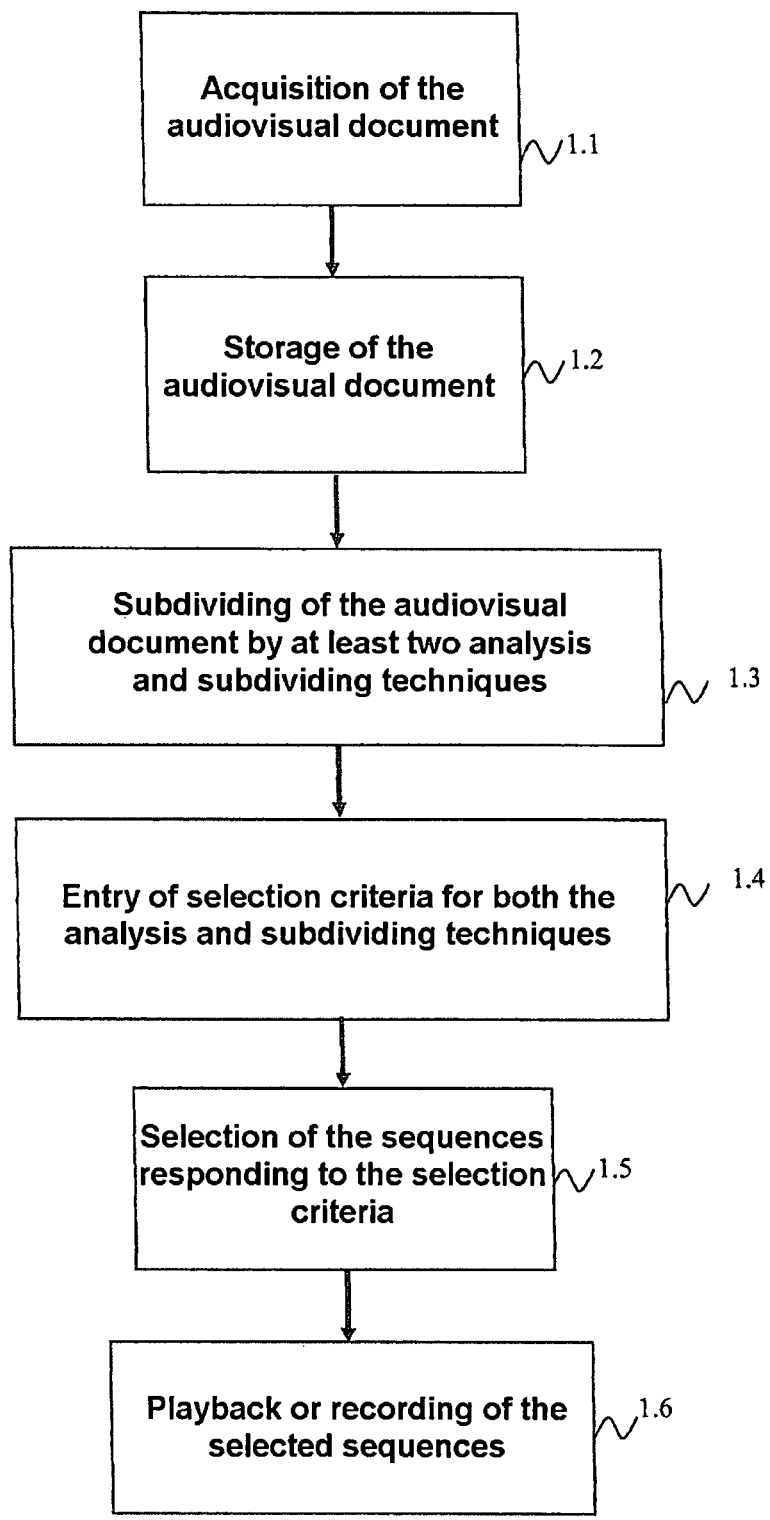

According to a refinement, the sequences are concatenated in a chronological order in order to generate an audiovisual document representative of the audiovisual document.

The invention also relates to a device for displaying the sequences selected according to the method.

18 Claims, 6 Drawing Sheets

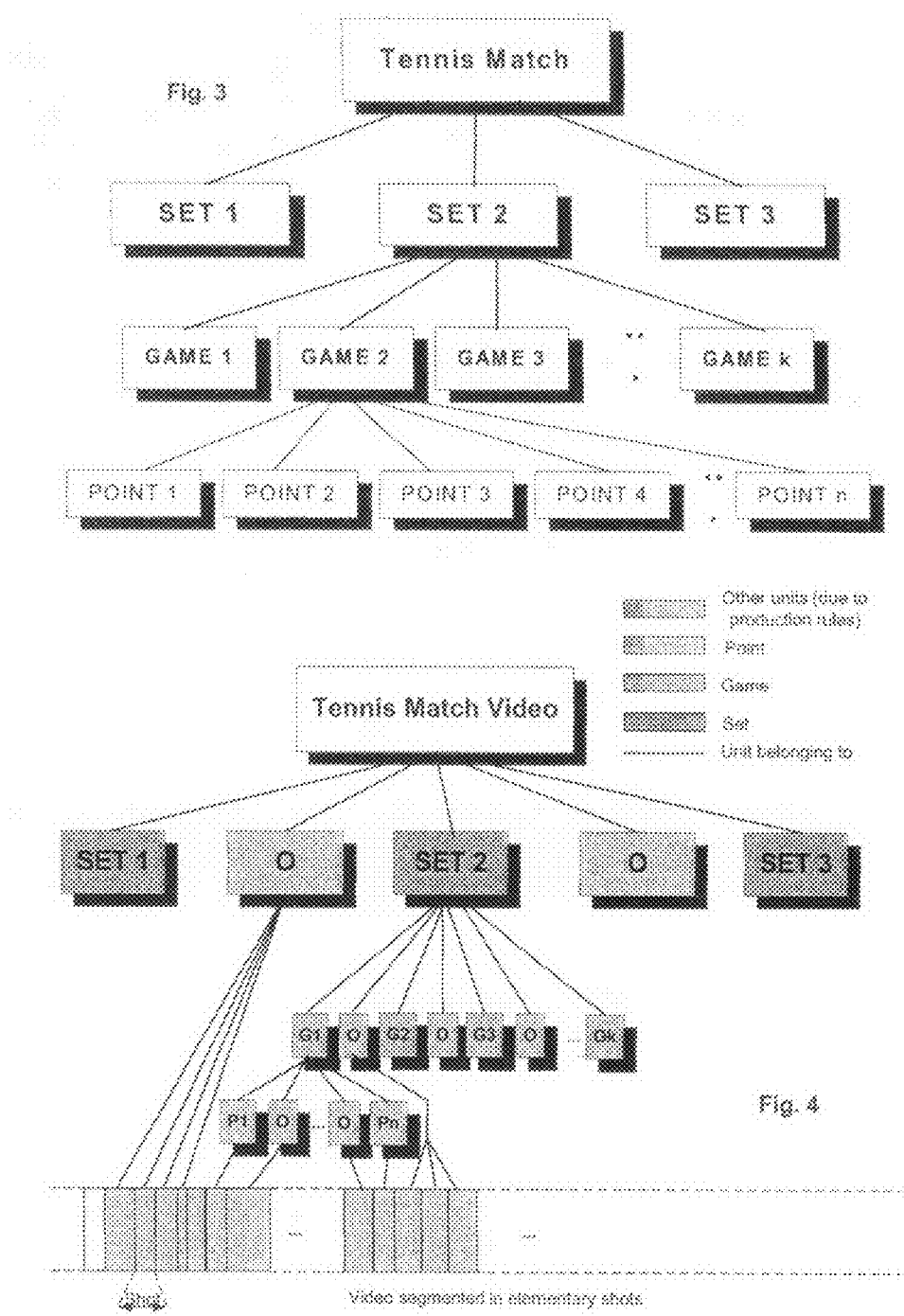

METHOD FOR SELECTING PARTS OF AN AUDIOVISUAL PROGRAM AND DEVICE THEREFOR

This application claims the benefit, under 35 U.S.C. §365 of Internal Application PCT/EP2006/060706, filed Mar. 14, 2006, which was published in accordance with PCT Article 21(2) on Sep. 21, 2006 in French and which claims the benefit of French patent application No. 0550690, filed Mar. 17, 2005.

The invention relates to a method of selecting and playing back video sequences extracted from a video document, and a device implementing the method. The invention applies more particularly when the video sequences are selected from several extraction means that can be activated by a user.

The context of the present invention is that of the extraction of video sequences from a video document. These days, very many video documents are produces, so sorting and subdividing manually are no longer possible, so it is important to develop robust tools for automatically analyzing these contents. There are numerous automatic techniques for subdividing a video document. One of the aims of subdividing a video document is to extract from it the best moments of the document and to be able to provide the user with a summary by concatenating these best moments. The field of sporting events is particularly demanding of video content analysis means. The analysis means can be adapted to each sport, but this entails as many means as there are sports practiced, and certain techniques can be more or less suitable for one and the same sport, and vice-versa.

Some sports are strongly time-dependent, such as football which is played in two halves of 45 minutes. For other sports, it is the score that predominates, for example in tennis where the winner is the one who wins two or three sets, however long it takes to achieve it. It is therefore important to take account of the constraint, either time or score, to analyze the document and extract the sequences from it.

Sporting events are filmed from a fixed number of cameras distributed around the playing area in order to be able to best capture the action. On transmission, the operator selects the viewpoint, that is, the camera that best reports the current action. From this basic control system on which the publication process is based devolves a set of production rules, shared by all professional sport videos. Because of this, a transmitted sporting document is already in itself a concatenation of sequences extracted from multiple sources.

If the operator considers that certain sequences are particularly interesting, for example in a football match, the action leading up to a goal, it marks them as such and these sequences are then retransmitted in slow motion. Patent application PCT/FR01/03377 filed by the applicant describes a manner of generating a summary from the extraction of the slow-motion sequences, the concatenation of the slow-motion sequences producing the summary. However, this technique first requires an analysis by the user to select the sequence and transmit it in slow motion.

In the case where the document is not previously processed, it is important to have analysis means to automatically extract high-level information enabling the document to be subdivided into sequences and then to characterize them. These sequences are then easily accessible by navigation commands. The user can thus browse through the document, searching for quite specific events.

A first analysis technique will consist in retrieving the structure of a video document knowing a priori the type of the document concerned and the associated video structure model. This technique is used to analyze sporting events. The analysis consists in taking account of the fixed structure intrinsic to the sport concerned and the more random structure linked to the editing rules used. One estimation method used is detailed in French patent applications FR02.13977 and FR02.13978 filed on 28 Oct. 2002 by the applicant.

Another technique consists in extracting sequences and indexing them according to event types. Thus, for tennis, it is possible to find missed first services, passing shots, and so on. A navigation based on these indices is, however, of limited interest for score-constrained sports, in which the number of indices can be low compared to that of the structure elements. In this type of sport, the preferred navigation method will therefore be by using the structure. The indices are made up of lists of pointers to moments that are important and characteristic of the video content.

In the case of time-constrained sports, the table of indices is pre-eminent. In the example of football, the structure of a football match is relatively poor (two halves made up of a certain number of shots). A table of indices cannot immediately be deduced from the structural subdivision of the match. In this case, it is necessary to develop index-extraction-dedicated algorithms.

US document 2002/184220—TERAGUCHI describes a method for indexing an audiovisual document according to various criteria. It is then possible to select parts of the documents according to multiple criteria. FIG. 21 and the corresponding text shows a subdivision of a baseball match into sequences. The sequences are characterized by predetermined actions, and assigned to one or other of the teams. Nothing in this document suggests a subdivision by any means other than indexing.

U.S. Pat. No. 5,708,767—YEO describes a method for automatically subdividing an audiovisual document in order to determine a graph of the various sequences. The graph is then represented by small images on the screen with the links. The displayed images serve as indices enabling the user to navigate from sequence to sequence. Nothing in this document suggests a subdivision by any means other than indexing.

US document 2004/014061—University of Rochester, describes a method of analyzing and subdividing audiovisual documents linked to sport (soccer). The method makes it possible to detect the slow-motion sequences and the goals. U.S. Pat. No. 6,630,522—ERDELYI describes a user interface that makes it possible to navigate over video sequences of a sport document. The video sequences are selected according to criteria that the user can select using a displayed menu. All these documents offer the user only a single subdividing means and ultimately do not allow any great finesse in the choice of sequences.

It can therefore be seen that each analysis technique has advantages according to the nature of the document being analyzed. The present invention offers a novel way of extracting sequences from a document in order to record them or play them back, in such a way as to best respond to the interests of the user.

To this end, the invention relates to a method of selecting parts of an audiovisual document, consisting in a step for analysis of the document by at least two different subdividing means, the two subdividing means producing two different groups of sequences extracted from the audiovisual document;

characterized in that it also comprises the following steps:
  entry of at least two sequence selection criteria, each associated with one of the at least two subdividing means,
  selection of at least one sequence of a group according to a selection criterion that has been entered and is associated with a subdividing means, at least one part of the selected sequence is common to another sequence of the other group, this other sequence responding to another entered selection criterion associated with the other subdividing means.

In this way, the user can choose selection criteria specific to each of the subdividing means so that the duly-selected sequences best respond to the wishes of the user. The selection of the parts of the document displayed is thus finer than if one or other subdividing means is used.

According to a first refinement, the user can choose the subdividing means in the group from which the sequences are selected. In this way, the selected sequences are obtained by a subdivision according to a subdividing means selected by the user.

According to another refinement, the method also comprises a step for generating a summary obtained by concatenating the selected sequences. According to a first variant, the sequences that make up this summary are ordered in the chronological order defined in the initial audiovisual document. According to a second variant, the sequences that make up this summary are ordered in the order defined by the entry of the selection criteria. In this way, the user can choose how the duly-created summary is organized.

According to another refinement, the initial audiovisual document consists of primary and/or final documents obtained from different sources. The method comprises a step for selecting a primary and/or final document, the subdividing means producing the groups of sequences from the selected primary and/or final document. In this way, the user can select the document that is then the subject of an optimal subdivision by the subdividing means.

According to another refinement, the method comprises a step for substituting a selected sequence with another sequence extracted from another primary and/or final document, the new sequence having the same time window as the substituted sequence within the initial document. In this way, the user can replace a sequence selected by the selection criteria with another sequence originating from another source and which to him seems more interesting.

According to another refinement, the method comprises a step for generating a satisfaction index assigned to a sequence generated by one of the subdividing means. This index is then a selection criterion, which enables the user to refine the selection of the sequences and keep only the most satisfactory of them. According to a first variant, the satisfaction index originates from the analysis of a physical quantity of the sequence, such as the sound. This variant makes it possible to automatically compute the satisfaction index. According to a second variant, the satisfaction index is entered manually, which makes it possible to enter a subjective selection criterion.

According to another refinement, a graphic bar is displayed which represents at least a part of the initial document according to the time and which shows the position of the selected sequences. Thus, the user sees at which moments of the initial document the selected sequences are extracted. According to a refinement, the graphic bar shows, by an icon associated with each sequence representation, the value of the satisfaction index associated with that sequence.

Another subject of the invention is a device for displaying video contents comprising at least two different subdividing means, each subdividing means producing a group of video sequences extracted from a video or audiovisual document; characterized in that it comprises a graphic interface comprising:

at least two areas each displaying a list of selection criteria, each associated with a subdividing means, a means for selecting at least one criterion from each of the two displayed lists of criteria, an area for displaying at least one sequence of a group selected according to a selection criterion associated with a subdividing means, at least a part of the selected sequence being common to another sequence of the other group, this other sequence responding to another selection criterion associated with the other subdividing means.

Figure 2:
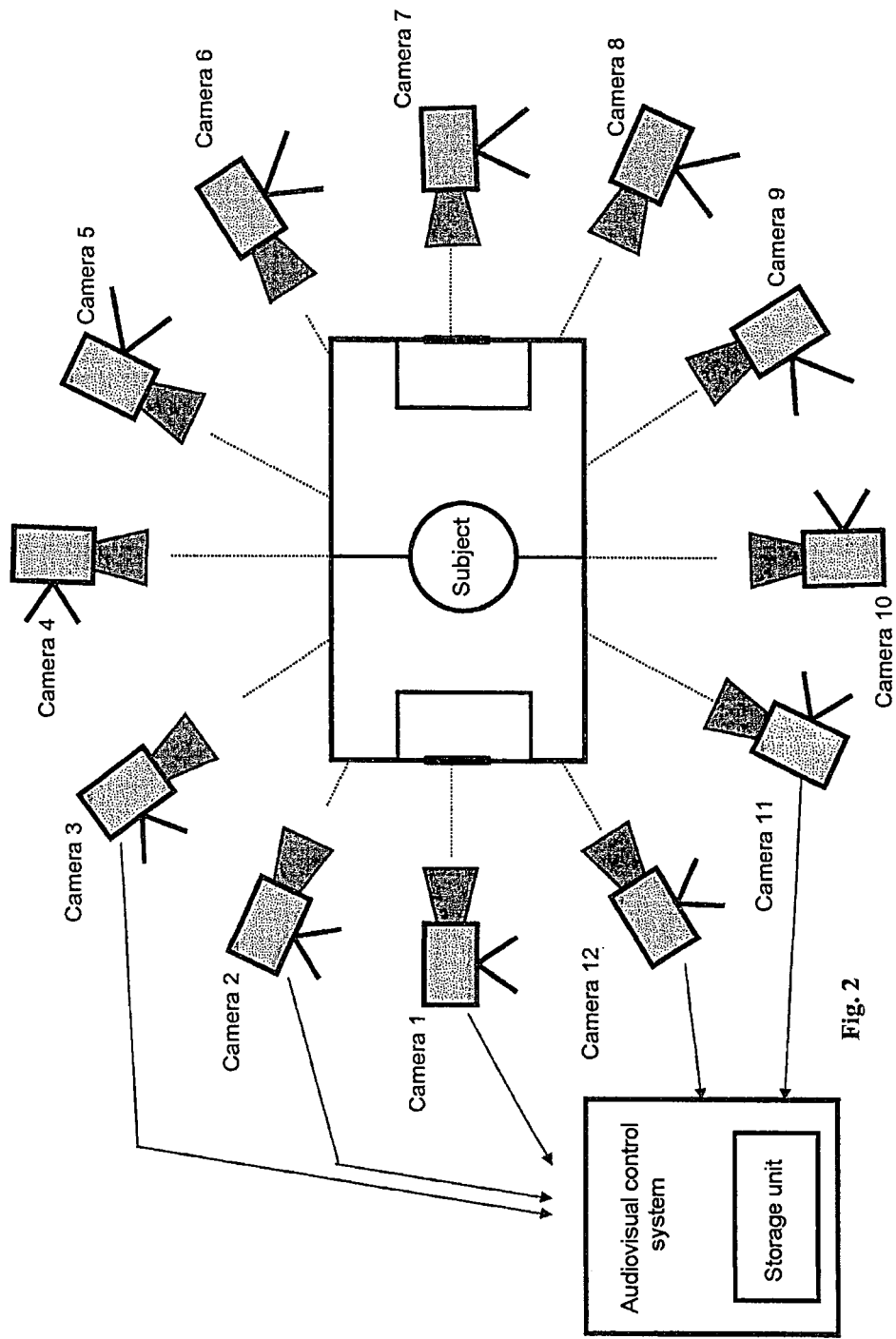
Figure 5:
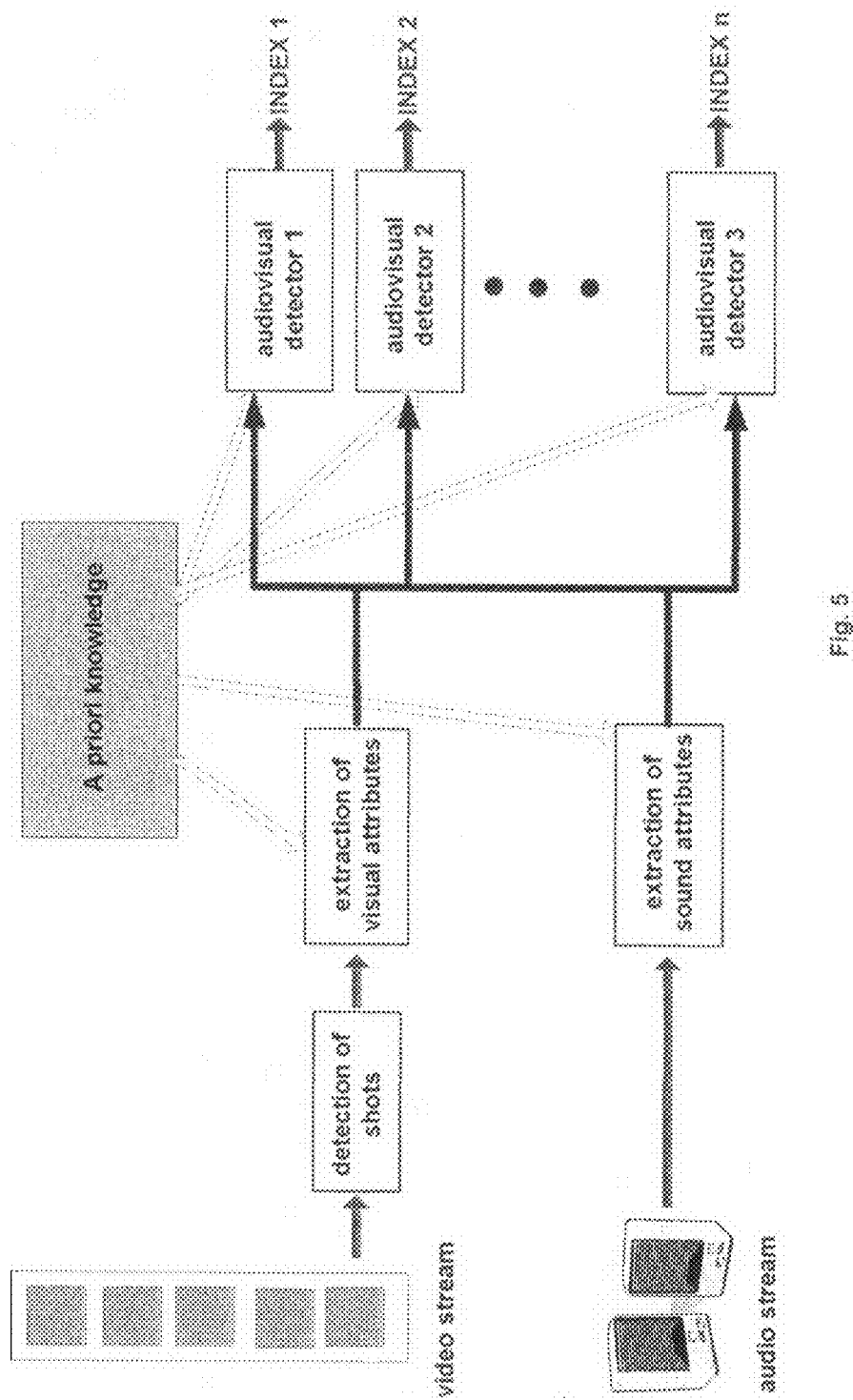
Figure 6:
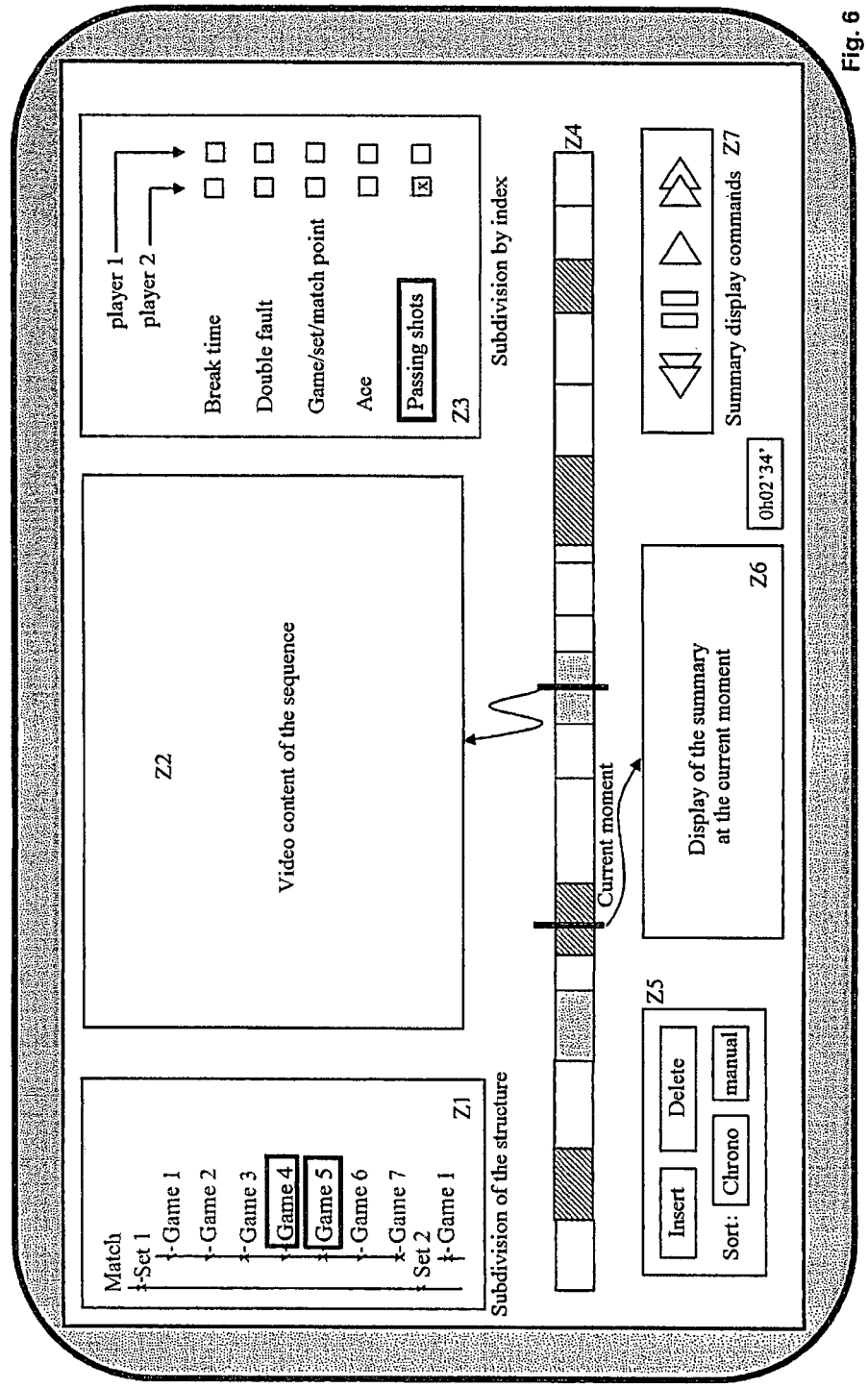
Figure 7:
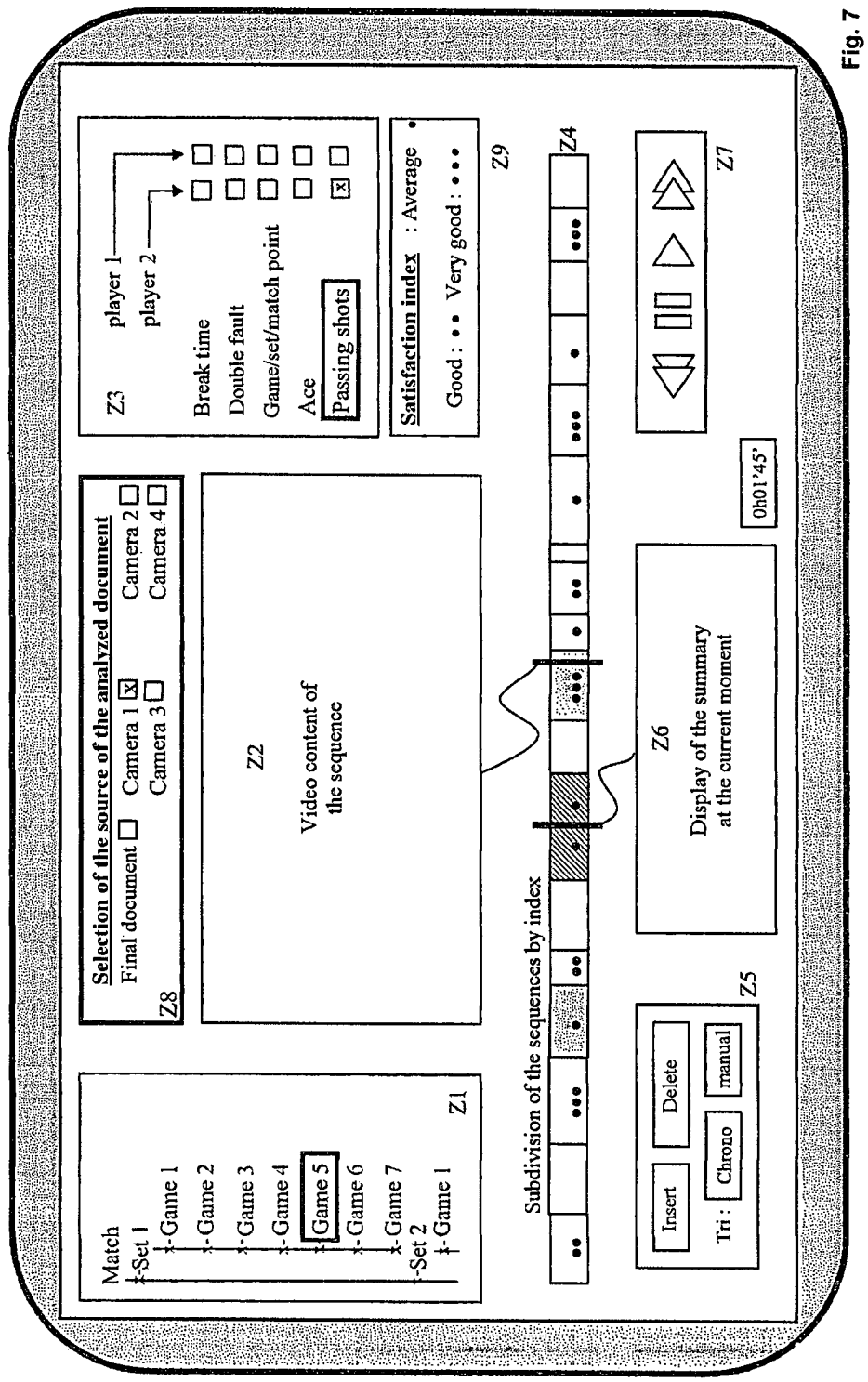

Other characteristics and advantages of the present invention will become apparent from the description of the exemplary embodiments given below, taken as nonlimiting examples, with reference to the appended figures in which:

FIG. 1 represents a general flow diagram of the steps according to one exemplary embodiment of the invention, FIG. 2 represents a system for acquiring audiovisual contents used to implement the invention, FIG. 3 represents a diagram showing the hierarchical structure of a tennis match, FIG. 4 illustrates how to segment an audiovisual document such as a tennis match, FIG. 5 shows a mechanism for extracting index sequences within an audiovisual document, FIG. 6 shows a screen layout according to one exemplary embodiment of the invention making it possible to select and play back sequences of an audiovisual document, FIG. 7 shows a screen layout according to another exemplary embodiment of the invention including two refinements for selecting sequences.

FIG. 1 is a general flow diagram of the steps used to select sequences and play them back or record them. According to one preferred exemplary embodiment, the method comprises five steps. In the first step—step 1.1—an audiovisual document is produced. This audiovisual document is a digital image data file, possibly associated with a sound component. The images are advantageously animated, but the document can also be made up of photos. In a second step—step 1.2—the document is stored in an easily-downloadable form. Then, the document is processed by a method of subdividing into sequences—step 1.3. At least two analysis techniques will be implemented in order to produce two groups of sequences, each having specific selection criteria. Then, in the step 1.4, the document is downloaded to a display appliance and a user enters selection criteria according to the two analysis techniques used previously. Two subgroups of sequences are then produced, each sequence of a subgroup is extracted from the group previously generated and responds to the selection criterion entered. In the step 1.5, the sequences that respond to all the selection criteria previously entered are selected. In as much as the time subdivisions according to one or other of the analysis and subdividing means are different, the selected sequences are those of which at least a part responds to all the criteria entered. For this, a sequence is taken from a first subgroup; if at least a part of this sequence is common to another sequence belonging to the other subgroup then it is selected, otherwise it is rejected. The selection process stops when all the sequences of the first group have been processed. In the step 1.6, the selected sequences are played back and/or recorded in order to produce a partition of the document that responds to the criteria entered.

FIG. 2 illustrates an audiovisual document production situation, the audiovisual document produced in this way will then be processed according to the method which is one of the subjects of the present invention. FIG. 2 relates to a football match, but this example is not limiting and any other audiovisual document, whether in another sport or in a different field of the sport, can be appropriate and can be used by the present invention.

The system illustrated in FIG. 2 comprises:
- a set of cameras and microphones filming the event,
- a local audiovisual control system for receiving the audiovisual contents originating from the cameras and from the microphones arranged around the pitch and storing them after possible processing.

According to one exemplary embodiment, the local control system associated with the organization of the sporting event comprises:
- a production unit for live feed,
- an editing unit to create reports (summaries of the day, report on a match, etc.),
- an automatic structuring and indexing unit,
- a manual indexing unit,
- an archiving unit.

The streams originating from each camera are annotated in real time throughout the day and comprise in particular a time marking that makes it possible to reference the images of the stream in time. The video content from each camera constitutes a primary document which is processed by an operator. According to the current action, the operator chooses such and such a part of a primary document to form a final document which is associated with the sporting event and transmitted. According to a variant, the automatic structuring and indexing modules separately process the primary documents generated throughout the day and add metadata to them. At any time, an operator can manually intervene by also adding high-level metadata. The operator can mark that certain sequences are likely to respond more specifically to certain criteria. For example, the particularly spectacular actions of a determined player in a football match are almost undetectable by an automatic system. This type of information is typically entered manually. According to a refinement, the operator associates a satisfaction index with a given sequence. If the index is high, this particularly interesting sequence can be the subject of a slow-motion replay. After automatic annotation and possibly manual annotation, the final document by possibly associating it with the primary documents are archived and/or transmitted to a playback unit, the aim of which is to play back at the request of a user sequences that respond to certain criteria and to create reports (summaries of a match or of a day of a tournament for example).

Once the document is stored, it can be processed by indexing techniques either on the storage unit, or on the playback unit. The processing of the document will consist in subdividing it into sequences that respond to determined criteria, and, following this processing, metadata associated with the document can be used to select and retrieve each sequence using a consultation engine.

A first means of analyzing a document is based on knowing the structure of the document, the structure allowing for a subdivision into hierarchical shots. For example, the hierarchical structure of a tennis match is shown in FIG. 3. The match is subdivided into sets, themselves being subdivided into games and then into points.

The structuring of a video can be defined as the subdividing of the video into meaningful semantic units. In the case of sport video documents, this structuring also comprises a phase for identifying different semantic units using the a priori knowledge of the structure of the type of sport concerned and a priori knowledge of the editing rules. The structuring of an audiovisual document consists in identifying the affiliation of a shot to an element of a structure imposed by the rules of the game or to an element linked to the way in which the video document has been produced (close-ups, advertisements, slow-motion replays, etc.).

FIG. 4 shows the structure of an audiovisual document containing a tennis match. The sequence subdivision of the document depends on the intrinsic structure of the tennis match (point, game, set and match) and explicit take rules. The units that originate directly from editing appear under the designation "other" (denoted O) in FIG. 4.

By way of examples, we can cite the following few editing rules:
- A take does not change during a point (a point therefore has associated with it only a single shot).
- Between two points, a few close-ups or slow-motion sequences are inserted.
- Advertisements are inserted every two games and between sets.

The structure of a document is analyzed in a number of steps. The first step consists in subdividing the video into shots (a shot being characterized by a take unit). Each shot has associated with it a key image representative of all the images that make up the shot concerned. Each image has associated with it a certain number of characteristics describing:
- The duration of the shot
- The activity in the shot (linked to the movement in the images)
- The distribution of the colors in the key image
- The texture of the key image These low-level attributes will be used to characterize the different shots as being game shots or other shots (a probability of belonging to each class being calculated).

The second step of the algorithm will consist in applying the a priori known structure of the document to the duly identified sequence of shots in order to retrieve the various semantic units. In other words, we seek to associate a semantic unit with each shot or group of shots. The method works as follows.

Each semantic unit has associated with it several probability distributions describing the values of the low-level attributes characterizing the unit concerned. Take, for example, the case of a semantic unit of "other" type separating two sets (denoted As) and separating two points (denoted Ap). Let us consider for each the distribution associated with the duration attribute. The longer a group of adjacent shots of "other" type lasts, the greater will be the probability of associating with it a unit As and the lower will be the probability of associating with it a unit Ap.

The transition from one semantic unit to another is also characterized by a so-called transition probability. For example, the transition probability associated with the transition from a semantic unit of type set1 to set2 will be low whereas that describing the transition from set1 to As will be high.

The set of the probability values Pt and Pu is calculated in an initial learning phase. Several hours of videos are thus manually labeled and the associated probabilities are calculated. We can note here that the structure of the video document is not taken into account explicitly, but results from learning. This property makes it possible to describe situations that can be missed by a purely deterministic approach (situations not seen in the learning process having a very low but non-zero probability of occurring). A video document is then structured by exploring all the possible readjustments and retaining only the one that maximizes the product of the probabilities associated with the transitions and with the labeling of the groups of shots in semantic units.

A second, means of analyzing a document is based on the characterization of shots according to a specific video element. FIG. 5 shows an example of a device for automatically extracting indices. The extraction of such indices is done using detectors working in parallel and taking as input visual and/or sound information. For each shot or group of shots of the video, each detector returns a response to the system indicating whether the index with which it is associated is present at this instant of the video. These detectors are strongly dependent on the type of video being processed. For football for example, the detectors that will advantageously be programmed will be detectors of:

- goals
- free kicks
- corners
- action leading up to the goals
- and so on

Other analysis means are also possible. For example, the sound amplitude can be a means for defining sequences. In practice, in tennis for example, a point very often ends with applause from the spectators, and because of this the analysis means subdivides the document into sequences intercut with sharp increases in the sound volume. Moreover, the sound power of the applause is proportional to the interest of the point. Also worthy of citing as another analysis technique is the movement of the players. Finally, it is always possible to intervene manually to set the start and the end of a sequence and enter this information as metadata, and it is also possible to assign it a satisfaction index.

Once the document is analyzed, the duly generated metadata is added to the audiovisual information of the document. A user can then work on this document using a processing and display appliance, typically a personal computer provided with sufficiently large storage capacity. The associated metadata is used to extract structural elements and index elements. This metadata comprises a pointer address and a duration thus defining a sequence of the document, and an attribute value characterizing the sequence type.

The consultation engine can process the following document sets:

- a single document that has already been processed, this so-called "final" document is, for example, the audiovisual content of a match transmitted by an operator; it is already the result of processing and the sequences that it comprises are already selected contents. It already has metadata, or
- one or more so-called "primary" documents which originate from sources such as cameras automatically filming an event. The content of a primary document has not been subjected to any processing and does not contain metadata, or
- a final document and several primary documents which are the source of this final document.

The user launches the consultation engine on his computer provided with a screen. Advantageously, the consultation engine is produced in the form of an executable program stored in the computer's memory. This should not, however, exclude the possibility that the functionalities provided by the assembly comprising this executable program, the central processing unit and the working memory of the computer can be produced separately or not by dedicated electronic circuits, ASICs or DSPs for example. The consultation engine is launched by selecting a set of audiovisual documents. In this set, a so-called "reference" document will be the one processed by the analysis means in order to obtain structural elements and index elements.

The consultation engine displays the screen layout illustrated by FIG. 6 according to one exemplary embodiment of the invention. The user has a keyboard with direction keys and function keys, and uses these keys to move a graphic index so highlighting one or more elements of an area. The user presses "ENTER" to select the highlighted element. A variant consists in having a pointing device such as a mouse. The user uses the mouse to move the pointer and clicks the mouse button to select the element pointed to. According to a preferred embodiment, the screen is subdivided into seven main areas:

Area 1 (top left): this area shows the structure of the selected document. The structure can be browsed through hierarchically by opening and closing a hierarchical level given by + and − icons. The user navigates within this structure using the direction keys and selects an element of the structure by pressing a function key (typically the ENTER key). The selected level is graphically highlighted by a different outline and background color).

Area 2 (top center): this is the area displaying the video sequence selected either by the structure by selecting an element of the area 1, or by an index element by selecting an element of area 3.

Area 3 (top right): this area contains attributes for selecting index elements corresponding to these attributes. Advantageously, the attributes have a sublevel associated with one or other of the players. In this way, the user can select a sequence according to whether it concerns one or other of the teams or a particular player. From the moment when the user selects an attribute, this attribute becomes a selection criterion for the sequences. If the user has also selected an index element in the area 1, then the selected sequences will respond to both criteria at the same time. However, the sequences obtained by one or other analysis means are not normally the same in time subdivision terms. By default, the consultation engine prioritizes the index sequences that contain a semantic unit because these are more interesting to a user. Take the example of football; if the user chooses the "team 2 leading in score" and "second half" criteria, then the sequence where the team 2 is leading and at least a part of which is located in the second half is selected. For example, this sequence begins towards the end of the first half when the team 2 scores a goal and leads 2-1, and ends when in the second half the team 1 scores a goal and leads 3-2. According to a variant, the sequence selected by the criteria entered by the user is obtained by a subdivision performed by one or other of the analysis means, according to a choice made by the user. This choice is entered through a submenu accessible as an option, the user selecting either "analyze by structure" or "analyzed by index" to define the mode for subdividing the retained sequences.

Area 4 (center of screen): this area is a graphic bar representing all or part of the document. The bar is subdivided into segments corresponding to sequences that can be selected by the user. By default, the consultation engine prioritizes the index sequences, which are those that are represented by segments. According to the same variant mentioned in the previous paragraph, the user uses a submenu to select whether the sequences selected by the criteria entered by the user originate from one or other of the analysis means. If the user chooses the index-based analysis means, then the graphic bar shows index elements as segments of the graphic bar. The segment width is proportional to the duration of the sequence. In the example of FIG. 6, the user has selected in zone 3 the successful passing shots of player 1 in games 4 and 5. On the graphic bar, the sequences showing the two passing shots played by player 1 are highlighted by shading. Two vertical lines represent the moment at which the image of the sequence selected by the extraction criteria and displayed in area 2 is located, and the moment at which the image of the sequence of the summary displayed in area 5 is located. In this way, the user can locate in time the duly displayed moments.

If the user directly selects a segment associated with a sequence, then this sequence is displayed in area 2 and can be inserted into the summary by an insertion command activated from area 5.

Area 5 (bottom left): this area contains the summary management commands such as: insert elements, sort sequences in chronological order, sort by order of insertion. When the user decides to insert the sequence or sequences obtained by selecting structural and/or index elements, he activates the icon marked "Insert". If the user wants to delete a sequence from the summary, he activates the segment associated with this sequence on the graphic bar in area 4. Area 6 then displays the content of the sequence which allows for an additional check. To delete the sequence from the current summary, the user activates the icon marked "Delete" in area 5. If the user wants the sequences currently selected and which constitute the summary to be recorded chronologically, then he activates the icon marked "Chrono". However, if the user wants the sequences currently selected to be recorded in the summary in the order in which they have been selected, then he activates the icon marked "Manual". The summary created in this way is a video data file stored in the computer.

Area 6 (bottom center): this area contains the video of the summary obtained by selecting structural or index elements. The summary is obtained by concatenating sequences in a chronological order. Advantageously, the graphic bar uses a graphic distinction to show whether a segment is or is not incorporated in the summary. In the example, the graphic distinction is made by cross-hatching lines. A time counter is displayed alongside the area 6, showing the overall duration of the summary currently created by the insertions requested by the user.

Area 7 (bottom right): this area contains the summary display commands: read, fast rewind, fast forward, stop on image. Activating these commands acts directly on the video content in area 6.

According to an important aspect of the present invention, the selection of one or more sequences can be done by selecting a criterion linked to the structure of the document (for example: a sequence of game 4 or 5) and to an index (for example, a point won by the player by a passing shot). The areas 1 and 3 can then be activated individually by the fact that the user selects one or more displayed elements. If no element is highlighted, the analysis means is not selected and is not involved in selecting the sequence. Thus, the user can:

select sequences by using a criterion defined by the structural analysis of the document, or select sequences using a criterion defined by an index applied to the document, or both.

In the example illustrated by FIG. 6, the user has selected the passing shots played by player 1, during games 4 and 5 of the match.

The user can use his consultation engine in two ways. Either he wants to display only sequences, and in this case he uses only the areas 1, 2 and 3, or he wants to create a summary of the document, by using all the displayed areas. In the first case, the user navigates in the video content by selecting either structural elements or index elements. The use of a single interface enables him to navigate rapidly and fully exploit the results of the document analysis. In the second case, the user produces a summary according to determined criteria and records this summary to display it later, or to transmit it to other users.

To take the example of tennis, during the day, cameras positioned around a court have automatically filmed several sporting encounters. Later, a journalist wants to construct a summary of one of these encounters. He is then given access to the primary documents obtained by the cameras. He launches the application which first analyzes one of the primary documents. The analysis will be based on the techniques explained previously, and after a few minutes the application has created the index table and the structural table corresponding to the encounter. The application then displays a menu enabling the user to select either sequences from the index table or sequences produced by the structural analysis of the match.

According to a refinement, a metadata item associated with each represents a satisfaction index. According to a first variant, this index is entered manually by an operator. According to a second variant, this index is calculated automatically by analyzing, for example, the overall sound level of the sequence. The higher the sound level, reflecting a level of excitement among the spectators, the more satisfied these same spectators are with the sequence. According to one exemplary embodiment, the index comprises three levels illustrated by the presence of one or more "☺" symbols. The symbols appear bottom right in area 2 of the sequence display. The symbols also appear in the segments of the graphic bar. In this way, the user can easily see the satisfaction index of the sequences illustrated by the graphic bar. According to this requirement, a new area 8 is added to the screen layout illustrated by FIG. 6. This area contains three buttons which can be selected by the user, one button marked "☺",, the second marked "☺☺" and the third marked "☺☺☺".. The user selects a button according to the desired satisfaction index level, and by doing so he adds an additional criterion to the other criteria defined by the structural elements and the index elements. For example, the user can select the sequences of the third set, marked "passing shot" by the index analysis and having a very high satisfaction index.

According to another refinement, the screen layout of FIG. 6 comprises a new area 9 enabling the user to select different sources. A sporting event is normally filmed by several cameras which produce primary documents. The final audiovisual document associated with the event is the concatenation of parts extracted from these primary documents. Normally, the operator chooses the source and defines the part that will be included in the final document. From this final document, the analysis techniques will generate structural elements or index elements. These elements are defined in a given time window. If the consultation engine has access to the primary documents originating from the various sources, the operator can choose to replace a sequence of the final document with another sequence obtained from a primary document and defined by the same time window. For this, the area 9 includes icons corresponding to the sources supplying primary documents and an icon for selecting the final document. The icon of the final document is selected by default on launching the consultation engine. The user of the consultation engine selects a sequence of the final document which is displayed in area 2, then selects the icon of another source which blinks. The sequence originating from that source is defined by the same time window and is then displayed in area 2. It can be inserted into the summary if the user activates the "Insert" icon in area 5. When the display of this sequence ends, the icon of the other source is switched off and the initial conditions are restored with the icon of the final document selected by default.

In the case where the user has only primary documents without having a final document, the area 9 contains no icon associated with the final document. Therefore, the user does not have a reference document enabling him to subdivide the overall duration of the event into time bands having determined characteristics. To solve this problem, at the outset, the user of the consultation engine uses the same new window to select the source and launches the analysis means, applying them to the primary document produced by this source. Once the analyses are completed, the primary document becomes the default document. By selecting the icon of a source, the user can replace the default primary document sequence with another sequence having the same time window and originating from the primary document produced by the source selected in area 0.

FIG. 7 shows a new screen layout with the refinements described above. The screen page shows two new areas. The area 8 located alongside the management areas of both structure and index analysis means enables a user to assign a satisfaction index to the sequence currently being displayed. According to a refinement, this index which comprises four levels appears on the graphic bar with the presence of none, one, two or three dots on each segment. In this way, the graphic bar tells the user immediately the sequences that are of great interest, and by selecting the segment, shows the sequence in area 2. An area 9 is placed above the display area 2. This area contains five icons enabling the user to select the source of the sequence that he is looking for, or the source of the document that he wants to analyze.

There now follows an example of use of the consultation engine in order to create a summary of a tennis match. The user navigates in the hierarchy by selecting the first set, then the first game, the last point and finally the sequence containing the exchange. The selected sequence is immediately played back in area 2. The user can thus check that it is actually of interest.

If the sequence is interesting, he clicks the "Insert" button in area 5 to add this sequence to the set of sequences that make up the summary.

He acts in the same way for all the shots to be incorporated in the summary. In the case where he has not previously identified the shots likely to be of interest to him, he can use the interface to navigate rapidly through the content and select the points to be included in the summary.

Finally, he adds the match point by selecting the last shot of the last game of the last set.

According to a refinement, the user can define the format of the summary created in this way for storage purposes. For example, the summary can comprise an html type page which is easy to download from the Internet.

It should be obvious to those skilled in the art that the present invention allows for embodiments in numerous other specific forms without departing from the scope of the invention as claimed. Consequently, the present embodiments should be considered as illustrations but can be modified in the field defined by the scope of the appended claims.

The invention claimed is:

1. A method performed by a computer of selecting parts of an audiovisual document comprising the steps of:
    analyzing the audiovisual document by at least two different subdividing means, the at least two subdividing means producing two different groups of sequences extracted from the audiovisual document, wherein one of the at least two subdividing means subdivides the audiovisual document into hierarchical shots associated to predefined meaningful semantic units, by using a priori knowledge of a hierarchical intrinsic structure of a type of content contained in the audiovisual document;
    the other of the at least two subdividing means subdivides the audiovisual document into sequences and indexes them according to event types of the audiovisual document;
    entering at least two sequence selection criteria, each specific to one of the at least two subdividing means, wherein one of said sequence selection criteria includes at least one hierarchical shot and the other of said at least two sequence selection criteria includes elements different from the hierarchical structure of the content; and
    selecting at least one sequence if at least one part of said sequence meets each of the at least two sequence selection criteria from each of the at least two different subdividing means further comprising a step for generating a satisfaction index assigned to a sequence generated by one of the subdividing means; said index being a selection criterion.

2. The selection method as claimed in claim 1; further comprising selecting a subdividing means, the selected sequences being extracted from the group of sequences produced by the selected subdividing means.

3. The selection method as claimed in claim 1; further comprising generating a summary obtained by concatenating the selected sequences, the sequences being ordered in the chronological order defined in the initial audiovisual document.

4. The selection method as claimed in claim 1; further comprising generating a summary obtained by concatenating the selected sequences, the sequences being ordered in the order defined by the entry of the selection criteria.

5. The selection method as claimed in claim 1; wherein the initial audiovisual document consists of primary and/or final documents obtained from different sources, the method further comprising a step for selecting a primary and/or final document, the subdividing means producing the groups of sequences from the selected primary and/or final document.

6. The selection method as claimed in claim 5; further comprising substituting a selected sequence with another sequence extracted from another primary and/or final document and having the same time window as the substituted sequence.

7. The selection method as claimed in claim 1; wherein the satisfaction index originates from the analysis of a physical quantity of the sequence, such as the sound.

8. The selection method as claimed in claim 1; wherein the satisfaction index is entered manually.

9. The selection method as claimed in claim 1; further comprising a step for displaying a graphic bar representing at least a part of the initial document according to the time and showing the position of the selected sequences.

10. The selection method as claimed in claim 1; further comprising: generating a satisfaction index assigned to a sequence generated by one of the subdividing means; said index being a selection criterion and
    displaying at least one icon associated with the representation of a sequence showing the value of the satisfaction index associated with that sequence.

11. A device for displaying video contents comprising:
    at least two different subdividing means, each subdividing means producing a group of video sequences extracted from a video or audiovisual document, wherein one of the at least two subdividing means subdivides the audiovisual document into hierarchical shots associated to predefined meaningful semantic units, by using a priori knowledge of a hierarchical intrinsic structure of a type of content contained in the audiovisual document;
    the other of the at least two subdividing means subdivides the audiovisual document into sequences and indexes them according to event types of the audiovisual document;

a graphic interface comprising: at least two areas each displaying a list of selection criteria, each list of selection criteria associated with one of the two different subdividing means, wherein one of said lists of selection criteria includes at least one hierarchical shot and the other of said at least two sequence selection criteria includes elements different from the hierarchical structure of the content;

a means for selecting at least one criterion from each of the two displayed lists of selection criteria; and an area for displaying at least one video sequence of which at least one part of said sequence meets each of the at least one selection criterion from each of the two different subdividing means further comprising means of generating a satisfaction index assigned to a sequence generated by one of the subdividing means; said index being a selection criterion.

12. The device for displaying video contents as claimed in claim 11; further comprising means of selecting a subdividing means, the selected sequences being extracted from the group of sequences produced by the selected subdividing means.

13. The device for displaying video contents as claimed in claim 11; further comprising means of generating a summary obtained by concatenating the selected sequences, the sequence being ordered in the chronological order defined in the initial audiovisual document.

14. The device for displaying video contents as claimed in claim 11; wherein the means of generating a satisfaction index further comprises analyzing a physical quantity of the sequence, such as the sound.

15. The device for displaying video contents as claimed in claim 11; wherein the means of generating a satisfaction index further comprises manually entering the index.

16. The device for displaying video contents as claimed in claim 11; further comprising means of displaying at least one icon associated with the representation of a sequence showing the value of the satisfaction index associated with that sequence.

17. The device for displaying video contents as claimed in of claim 11; further comprising means of displaying a graphic bar representing at least a part of the initial document according to the time and showing the position of the selected sequences.

18. A method of selecting parts of an audiovisual document comprising the steps of:

analyzing the audiovisual document by at least two different subdividing means, the at least two subdividing means producing two different groups of sequences extracted from the audiovisual document, wherein one of the at least two subdividing means subdivides the audiovisual document into hierarchical shots associated to predefined meaningful semantic units, based on a priori knowledge of a hierarchical intrinsic structure of a type of content contained in the audiovisual document, and the other of the at least two subdividing means subdivides the audiovisual document according to at least one index applied to the document;

entering at least two sequence selection criteria, each specific to one of the at least two subdividing means, wherein one of said sequence selection criteria includes at least one hierarchical shot and the other of said at least two sequence selection criteria includes said at least one index; and selecting at least one video sequence that links the structure of the document to the at least one index of the document further comprising a step for generating a satisfaction index assigned to a sequence generated by one of the subdividing means; said index being a selection criterion.

* * * * *